(12) United States Patent
Milosevski et al.

(10) Patent No.: US 9,578,212 B2
(45) Date of Patent: Feb. 21, 2017

(54) METHOD FOR VIDEO RECORDING AND EDITING ASSISTANT

(71) Applicant: NXP B.V., Eindhoven (NL)

(72) Inventors: Vlatko Milosevski, Eindhoven (NL); Benoit Brieussel, Vitry sur Seine (FR); Francois Martin, Paris (FR)

(73) Assignee: NXP B.V., Eindhoven (NL)

( * ) Notice: Subject to any disclaimer, the term of this patent is extended or adjusted under 35 U.S.C. 154(b) by 199 days.

(21) Appl. No.: 14/579,848

(22) Filed: Dec. 22, 2014

(65) Prior Publication Data

US 2015/0189130 A1 Jul. 2, 2015

(30) Foreign Application Priority Data

Dec. 30, 2013 (EP) .................................... 13290331

(51) Int. Cl.

| | |
|---|---|
| *H04N 9/80* | (2006.01) |
| *H04N 5/92* | (2006.01) |
| *H04N 5/222* | (2006.01) |
| *H04N 5/232* | (2006.01) |
| *G11B 27/00* | (2006.01) |
| *G11B 27/02* | (2006.01) |
| *H04N 5/77* | (2006.01) |
| *H04N 5/94* | (2006.01) |
| *H04N 9/88* | (2006.01) |

(52) U.S. Cl.
CPC .......... *H04N 5/2228* (2013.01); *G11B 27/005* (2013.01); *G11B 27/02* (2013.01); *H04N 5/23222* (2013.01); *H04N 5/23254* (2013.01); *H04N 5/23293* (2013.01); *H04N 5/77* (2013.01)

(58) Field of Classification Search
CPC .............. H04N 9/80; H04N 5/92; H04N 5/94; H04N 9/88
USPC ................ 386/263, 242, 239, 241, 240, 326
See application file for complete search history.

(56) References Cited

U.S. PATENT DOCUMENTS

| | | | |
|---|---|---|---|
| 8,559,751 B2 * | 10/2013 | Gobert ...................... | G06T 7/20 348/208.99 |
| 2003/0146984 A1 | 8/2003 | Sakaguchi et al. | |
| 2006/0152606 A1 | 7/2006 | Noguchi | |
| 2006/0233391 A1 | 10/2006 | Park et al. | |
| 2006/0242340 A1 * | 10/2006 | Ono ....................... | H04N 7/173 710/62 |
| 2008/0013851 A1 | 1/2008 | Ishiwata et al. | |

(Continued)

FOREIGN PATENT DOCUMENTS

| | | |
|---|---|---|
| AU | 29733/89 A | 8/1989 |
| EP | 0 580 333 A2 | 1/1994 |
| WO | 2010/146558 A1 | 12/2010 |

OTHER PUBLICATIONS

Extended European Search Report for EP Patent Appln. No. 13290331.1 (Oct. 6, 2014).

*Primary Examiner* — Daquan Zhao
(74) *Attorney, Agent, or Firm* — Rajeev Madnawat (57) ABSTRACT

A method for a video recording and editing application analyses the audio and video during the process of video recording using a smart device such as a smartphone or tablet. The method provides feedback to the user during the video recording to improve user performance and reduce video and audio user errors. The method includes the option of automatic skipping or editing of video segments that suffer from user errors during playback.

19 Claims, 5 Drawing Sheets

(56) References Cited

U.S. PATENT DOCUMENTS

| | | |
|---|---|---|
| 2008/0075425 A1* | 3/2008 | Watanabe ................ H04N 5/76 |
| | | 386/241 |
| 2008/0204564 A1 | 8/2008 | Yumiki |
| 2008/0309786 A1 | 12/2008 | Archibald et al. |
| 2010/0149378 A1 | 6/2010 | Suzuki |
| 2011/0310284 A1 | 12/2011 | Tsujii |
| 2012/0144247 A1 | 6/2012 | Brown et al. |

* cited by examiner

FIG. 1

| User Error | Detection Technique |
|---|---|
| finger on lens | examine incoming video frames for black or orange regions exceeding a threshold size |
| finger on microphone | examine incoming audio frame for audio signal drop exceeding a threshold value |
| excessive shaking | perform analysis on motion vectors in video frame or use accelerometer data to determine level of horizontal, vertical and rotational motion |
| hand-drop | perform analysis on motion vectors in video frame to detect large downward motion or use accelerometer data to detect large downward movement |
| excessive duration of static scene | perform analysis on incoming video frames to detect motion energy level of the scene and monitor accelerometer for camera motion and clock for scene duration |
| fast panning or focus jumps | perform analysis on incoming video frames to detect high peaks of energy or movement above a pre-defined value or monitor accelerometer data |

FIG. 2A

| User Error | Detection Technique |
|---|---|
| zoom-ins/zoom-outs too fast | detect speed of pinch and zoom finger movement on video screen or perform analysis of video frames to identify specific motion indicating zoom-ins/zoom-outs are too fast |
| poor panning due to uneven vertical/horizontal hand movement | monitor accelerometer data to determine vertical or horizontal stability of motion or perform analysis of video frames to extract vertical and horizontal motion vectors and compare to pre-determined values |
| too much or too little light | monitor light sensor intensity data or perform analysis of video frames for white balance and contrast |
| smart device camera is in skewed orientation | monitor accelerometer data to determine angle to horizon or perform analysis of video frames to identify objects to determine horizon |
| smart device camera in vertical position | monitor accelerometer data to determine smart device camera position |

| User Error | Detection Technique |
|---|---|
| oscillating audio gain | determine sound gain levels and their variation over time in audio input |
| wind noise | detect audio signal saturation and wind noise pattern in audio input |
| audio signal saturation | detect audio signal saturation |
| excessive user commentary | detect amount of speech coming from microphone that is oriented in direction of user |
| incorrect camera mode for conditions | check user errors and determine whether another camera mode would reduce user errors |

260 → oscillating audio gain
265 → wind noise
270 → audio signal saturation
275 → excessive user commentary
280 → incorrect camera mode for conditions

METHOD FOR VIDEO RECORDING AND EDITING ASSISTANT

CROSS-REFERENCE TO RELATED APPLICATIONS

This application claims the priority under 35 U.S.C. §119 of European patent application no. 13290331.1, filed on Dec. 30, 2013, the contents of which are incorporated by reference herein.

BACKGROUND

Consumer use of mobile smart devices such as smartphones and tablets that are able to record video has increased significantly in recent years. As a consequence, more consumers are using smart devices to record video content instead of the more traditional dedicated digital photo and video camera devices.

Consumer recorded video content on mobile smart devices often suffers from user errors which typically result in poor visual and for audio quality recordings leading to consumer frustration. These user errors may occur even though the smart device is enabled with many hardware and software video recording features. Typical user errors include putting fingers over camera lens or microphone of the smart device during recording, holding smart device at an angle so the horizon is skewed, pointing the lens of the smart device directly at the sun or light source, lowering smart device prior to stopping recording, panning the smart device too quickly resulting in an abrupt change of scene, keeping the smart device recording a static scene for an excessive period of time making the video boring to watch, having objects in the focus of the smart device video recording that are too small and require zooming, objects in the focus of the smart device are moving too rapidly, smart device video recording is too shaky, sound level is too high or too variable, zoom rate is too fast or too slow and extraneous noise sources affect quality of the sound recording.

SUMMARY

According to a first aspect, there is disclosed a method for interactively assisting a user with a video recording assistant in recording video content on a smart device having video recording capability, the method comprising: receiving an input related to a property of a video recording for analysis in an analysis component of the video recording assistant; analyzing the input for a user error in the analysis component; sending notification from the analysis component to a control center of the video recording assistant if a user error is detected; and sending feedback from the control center to the user identifying the detected user error in the form of a graphical icon on a video display of the smart device.

In embodiments, the input comprises a one of video frames, audio frames, accelerometer data and light intensity data In embodiments the graphical icon is animated to provide feedback as to a magnitude of the user error.

In embodiments, the control center causes a first digital mark to be created on a first video frame of the video recording when the user error is detected and causes a second digital mark to be put on a second video frame of the video recording when the user error is no longer detected.

The method may further comprise automatically editing the video recording by detecting the first and second digital mark and skipping over or editing out video frames between and including the first and second video frames on playback by the video recording assistant.

In embodiments in which the input comprises video frames, the analysis in the analysis component may comprise a one of determining the motion vectors and determining a motion energy level of a scene.

In embodiments in which the input comprises audio frames, the analysis in the analysis component may comprise detecting a wind noise pattern.

The method may further comprise feedback to the user by providing an audio message.

In embodiments, the smart device is in a first camera mode and the method further comprises the control center checking whether the user error can be mitigated by switching the smart device to a second camera mode.

In embodiments, the property of the video recording is related to at least one of the group consisting of an audio input, a video input and a sensor input.

In embodiments the control center automatically pauses the video recording the user does not respond to the feedback with corrective measures after a pre-determined amount of time.

In embodiments the control center tracks the user error over a plurality of video recordings and provides statistical feedback to the user on a frequency of the user error.

In embodiments, the control center at least one of provides positive feedback to the user if the frequency of the user error decreases over time and provides suggestions for improvement to the user after completion of the video recording.

In embodiments, user settings are input into the control center by the user.

According to another aspect there is provided a non-transitory computer-readable storage medium comprising instructions that, when executed in the smart device having video recording capability, enable the method as described above.

DETAILED DESCRIPTION OF THE DRAWINGS

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which conic within the meaning and range of equivalency of the claims are to be embraced within their scope.

Reference throughout this specifications to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

In accordance with embodiments of the invention, a method for video recording and editing assistance using a processor on a mobile smart device such as a smartphone or tablet computer is disclosed. The method may be implemented, for example, via a software application that is downloaded to the memory of a mobile smart device and which runs on top of the smart device operating system, is a pre-embedded application that is part of the smart device camera application or is included inside the software operating system as a modification to, for example, Android™ OS or other operating systems for smart devices. The method in an embodiment in accordance with the invention may be wholly or partly implemented in firmware. The method involves analyzing the video and audio being recorded by the smart device and monitoring sensor inputs along with the system clock of the smart device during the recording. Patterns of the typical user errors that occur in consumer video recordings are detected and interpreted depending on the combination of patterns and the current operational mode of the smart device camera. The user is notified by a suitable graphical user interface graphical icon, text message and/or audio message of the errors, and of possible corrective measures to take for correcting the error. Additionally, corrective actions may be performed automatically in accordance with the invention. The method also may track the user's performance over time and provide positive feedback on improvements in the user's operational performance and provide suggestions for improving user operational performance after each recording.

Optionally, instead of notifying the user by a suitable graphical user interface, text message and/or audio message of the errors, the portions of the video recording having user errors can be digitally marked. Then the video assistant application can automatically edit out or skip these portions of the recording on playback and provide a shorter and more error free video recording more suitable for viewing or uploading to a social network site such as FACEBOOK, YOUTUBE or GOOGLE+.

Figure 1:
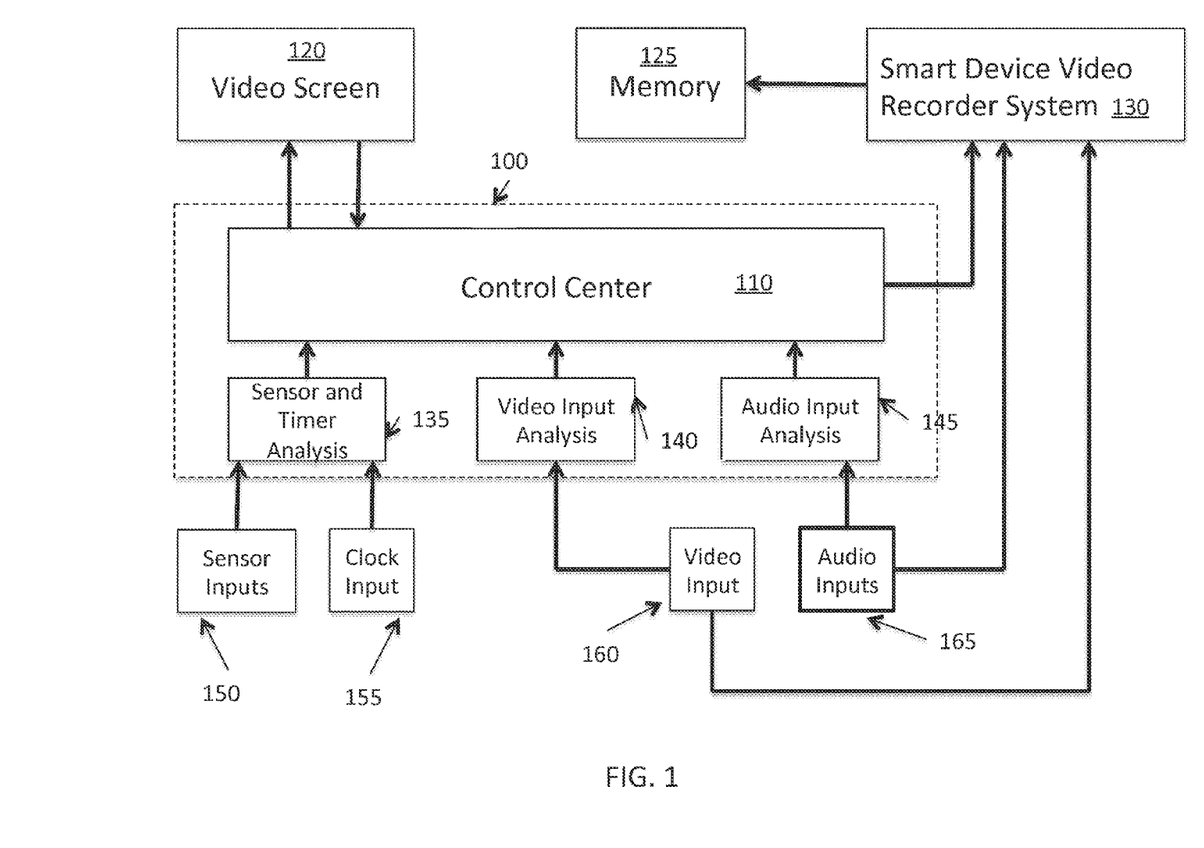
FIG. 1 shows an embodiment in accordance with an aspect of the invention.

FIG. 1 shows an embodiment in accordance with the invention of video recording assistant system 100 and typical components of a smart device that interface to video recording assistant 100. Control center 110 of video recording assistant system 100 monitors the user's progress for each video recording. Control center 110 maintains the user settings and configurations that can be turned on or off, selected or fine tuned for detecting specific errors. Note that the user settings may be used to adjust the threshold and or pre-determined values used in the error detection. Control center 110 controls smart device video recorder system 130 running on the smart device such that, for example, if an error occurs, control center 110 may, for example, pause/resume a video recording or select a more suitable camera mode, mute a saturated microphone and switch to a non-saturated micro-phone. Smart device video recorder system 130 saves the video frames to memory 125 of the smart device, control center 110 provides hints and tips for correcting the most common errors that a user has made in their video recording and provides graphical icons to indicate errors and/or the corresponding text description to video screen 120 of the smart device for display to the user. Note that the graphical icons may be animated to provide a more interactive user experience and communicate the magnitude of the user error. Optionally, user error feedback can be provided via audio messages using, for example, a text to speech synthesizer and output on the smart device speaker. Improvement statistics are also provided to the user by control center 110 as positive feedback. For example, in a prior video recording, a user may have made a total of n errors with half being of the same type and in the latest recording there are n-3 mistakes with only two being of the same type. Control center 110 accepts notifications on detected errors from video input analysis component 140, audio input analysis component 145, and sensor and timer analysis component 135. Control center 110 determines whether or not to perform an action upon receipt of notifications from video input analysis component 140, audio input analysis component 145, and sensor and timer analysis component 135. Video input analysis component 140, audio input analysis component 145, and sensor and timer analysis component 135 are controlled and configured by control center 110 according to the user's settings.

Figure 2A:
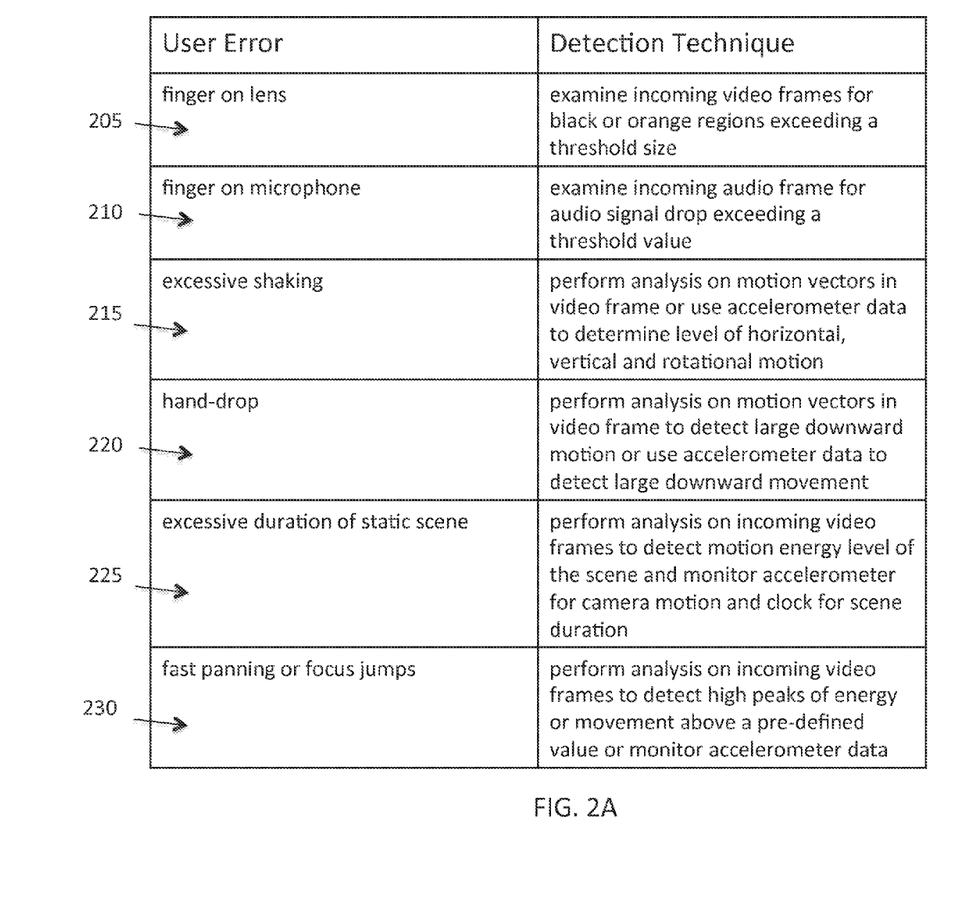
FIGS. 2a-c shows embodiments in accordance with an aspect of the invention.
Figure 2B:
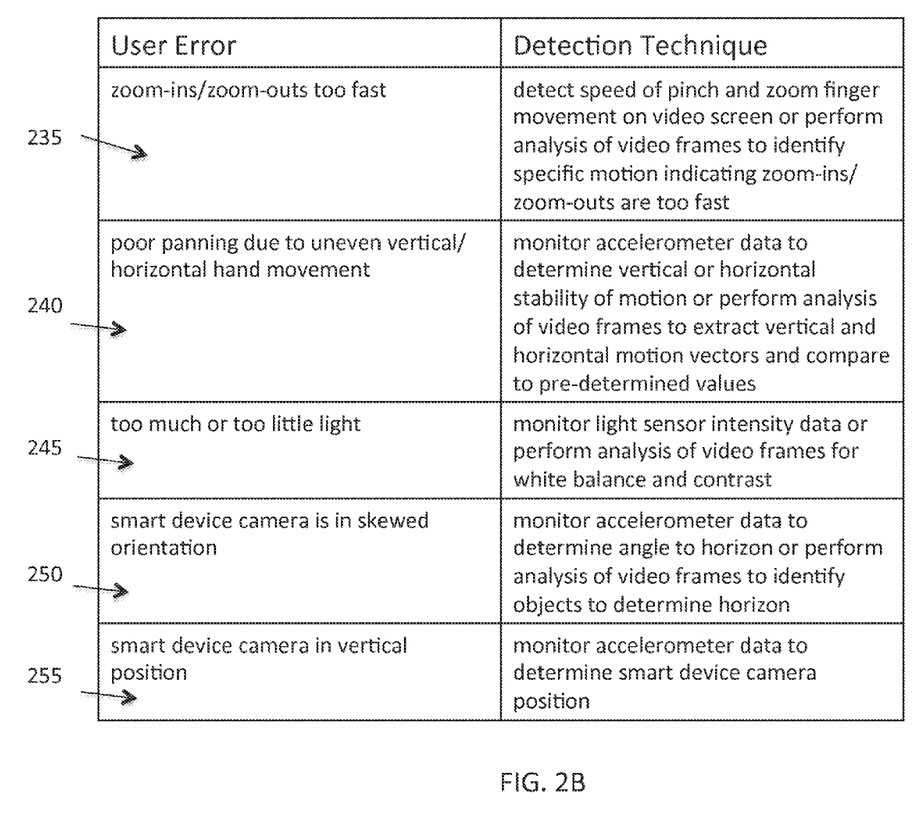
Figure 2C:
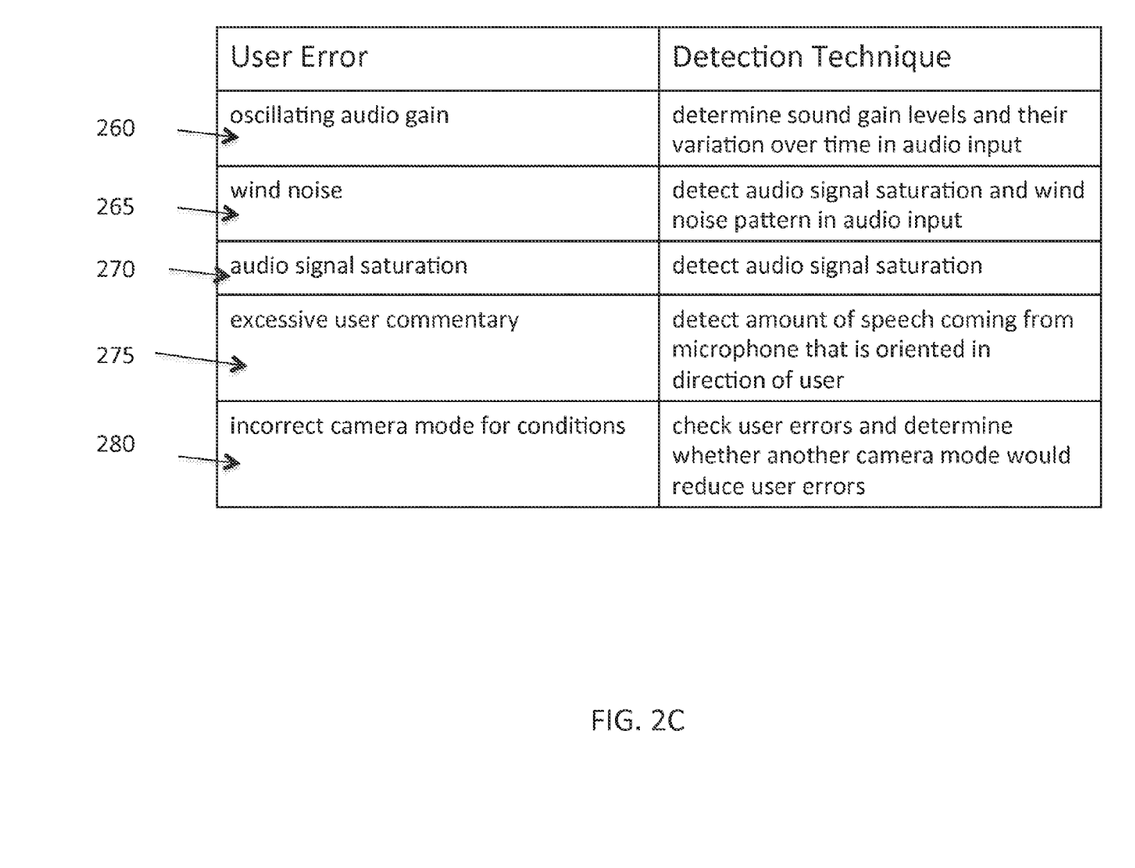

Video input analysis component 140, audio input analysis component 145, and sensor and timer analysis component 135 receive direct input from video input 160 of the smart device, audio input 165 of the smart device, sensor input 150 and clock input (typically from the smart device system clock) 155 of the smart device, respectively, and notify control center 110 if an error is detected. Video analysis component 110 performs a sequential video analysis on the incoming RGB or YUV video frames for error detection. Audio analysis component 145 performs analysis of PCM (Pulse Code Modulated) audio frames for error detection. Sensor and timer analysis component 135 performs analysis of sensor readings and clock information for error detection. Sensor inputs 150 may include data inputs from, for example, an accelerometer and a light meter. Details of video, audio and sensor and timing analysis for detecting errors is discussed below with FIGS. 2a-c showing user errors and their respective detection techniques.

Consider user error 205 which involves placement of a finger on the camera lens during the video recording. Video input analysis component 140 examines the incoming video frames from video input 160 for black or orange regions exceeding a size threshold located in the corners of the captured video frames. If the threshold is exceeded, notification is provided by video input analysis component 140 to control center 110 which generates the feedback to the user.

Feedback to the user during the recording may involve displaying a graphical icon indicating a finger on the lens on video screen 120 with accompanying text recommending removal of the finger. In the event the user does not respond in a timely manner, the video recording may be paused until the finger is removed. Additionally or alternatively, video input analysis component 140 may notify control center 110 to insert a Begin Mark on the video frame where the error with the detected pattern first occurs and notify control center 110 to insert an End Mark once the detected pattern is no longer present. The marked video segment may then be automatically edited out on playback or skipped over on playback.

Consider user error 210 Which involves placement of a finger on the micro-phone during the video recording. Audio input analysis component 165 examines the incoming audio PCM frames from audio input 165 for an audio signal drop beyond a threshold value. If the audio signal drop is beyond a threshold value, notification is provided by audio input analysis component 165 to control center 110 which generates the feedback to the user. Feedback to the user during the recording may involve displaying a graphical icon indicating a finger on the microphone on video screen 120 with accompanying text recommending removal of the finger. In the event the user does not respond, the recording may be paused until the finger is removed from the microphone. Additionally or alternatively, audio input analysis component 145 may notify control center 110 to insert a Begin Mark on the audio frame where the error with the detected pattern first occurs and notify control center 110 to insert an End Mark once the detected pattern is no longer present. The marked audio segment may then be automatically edited out on playback or skipped over on playback.

Consider user error 215 which involves excessive shaking of the smart device during a video recording, typically due to excessive user hand shaking. Video input analysis component 140 may perform analysis on the motion vectors to detect camera shake (see for example, U.S. application Ser. No. 11/995037 incorporated herein by reference). If camera shake is detected, notification is provided by video input analysis component 140 to control center 110 which generates the feedback to the user. Alternatively, sensor and time analysis component 135 may obtain accelerometer data from sensor inputs 150 to determine the level of horizontal, vertical and rotational motion. If the calculated motion exceeds pre-defined levels, notification is provided by sensor and time analysis component 135 to control center 110 which generates feedback to the user. Feedback to the user during the recording may involve displaying a graphical icon on video screen 120 indicating camera shaking with accompanying text recommending activation of the smart device camera anti-shake feature to the user. In the event the user does not respond in a timely manner, the video recording may be paused until the smart device camera is stabilized. Additionally or alternatively, video input analysis component 140 or sensor and time analysis component 135 may notify control center 110 to insert a Begin Mark on the video frame where the error of the camera shaking first occurs and notify control center 110 to insert an End Mark once the shaking is no longer present. The marked video segment may then be automatically edited out on playback or skipped over on playback.

Consider user error 220 which involves a hand-drop before the video recording has stopped. Video input analysis component 140 may perform analysis on the motion vectors to detect a large motion in the downward direction. If hand-drop is detected, notification is provided by video input analysis component 140 to control center 110 which generates the feedback to the user. Alternatively, sensor and time analysis component 135 may monitor accelerometer data from sensor inputs 150 where hand-drop of the smart device may be determined by the large degree of movement on the vertical axis. If hand-drop is detected, notification is provided by sensor and time input analysis component 135 to control center 110 which generates the feedback to the user. Feedback to the user during the recording may involve displaying a graphical icon on video screen 120 indicating hand-drop with accompanying text recommending the user raise the smart device camera. In the event the user does not respond in a timely manner, the video recording may be paused until the smart device camera is raised or the recording stopped by the user. Additionally, or alternatively, video input analysis component 140 or sensor and time analysis component 135 may notify control center 110 to insert a Begin Mark on the video frame where the error of the smart device camera hand-drop first occurs and notify control center 110 to insert an End Mark once the hand-drop has been corrected by raising the smart device camera. The marked video segment may then be automatically edited out on playback or skipped over on playback.

Consider user error 225 which involves video recording a static scene beyond a pre-defined amount of time. The pre-defined amount may be a default value or entered by the user into user settings via control center 110. Video input analysis component 140 analyses the incoming video frames from video input 160 to detect the motion energy level of a scene while sensor and time analysis component 135 monitors accelerometer input from sensor inputs 150 that indicates whether the smart device is stationary and sensor and time analysis component 135 monitors clock input 155 to detect the time duration of the scene. If the pre-defined amount of time is exceeded feedback is generated by video input analysis component 140 and sensor and time analysis component 135 to control center 110 which generates the feedback to the user. Feedback to the user during the recording may involve displaying a graphical icon indicating a static scene inn video screen 120 with accompanying text informing the user of a static scene error. Optionally, the recording may be paused by control center 110 instructing smart device recorder system 130 to pause the recording until the motion energy level of a scene increases or the user moves the smart device in another direction. Additionally or alternatively, video input analysis component 140 may notify control center 110 to insert a Begin Mark on the video frame where the error of a static scene is first detected due to low motion energy level in the scene and notify control center 110 to insert an End Mark once the motion energy level exceeds a pre-defined amount. The marked video segment may then be automatically edited out on playback or skipped over on playback.

Consider user error 230 which involves rapid movements such as fast panning or focus jumps. Video input analysis component 140 analyses the incoming video frames from video input 160 to detect high peaks of energy or movement that exceed a pre-defined value. If rapid movement is detected, notification is provided by video input analysis component 140 to control center 110 which generates the feedback to the user. Alternatively, sensor and time analysis component 135 may monitor accelerometer data from sensor inputs 150 to detect rapid movement of the smart device during video recording when horizontal and or vertical accelerometer values exceed a pre-defined value. If rapid movement is detected, notification is provided by sensor and time analysis component 135 to control center 110 which generates the feedback to the user. Feedback may involve displaying a graphical icon indicating rapid movement on video screen 120 with accompanying text informing the user of the error. Optionally, the recording may be paused by control center 110 instructing smart device recorder system 130 to pause the recording until the user has remedied the error. Additionally or alternatively, video input analysis component 140 may notify control center 110 to insert a Begin Mark on the video frame where the error of rapid movement is first detected due to high peaks of energy or movement and notify control center 110 to insert an End Mark once the high peaks of energy or movement are no longer present. The marked video segment may then be automatically edited out on playback or skipped over on playback.

Consider user error 235 which involves making zoom-ins or zoom-outs too fast. If video screen 120 has implemented touch capability for the zoom function, video screen 120 the can transmit the speed of the pinch and zoom finger movement of the user on video screen 120 to control center 110 which generates feedback to the user if a pre-defined value or values are exceeded. Alternatively, fast zoom-ins or zoom-outs may be detected by video input analysis component 140 from the incoming video frames from video input 160 by identifying specific motion: the rate of objects or contours in the video frame increasing or decreasing in size exceeds a pre-defined value. If the pre-defined value is exceeded, video input analysis component 140 provides notification to control center 110 which generates feedback to the user. Feedback may involve displaying a graphical icon indicating too fast zoom-in or zoom-outs on video screen 120 with accompanying text informing the user of the error. Optionally, the recording may be paused by control center 110 instructing smart device recorder system 130 to pause the recording until the user has remedied the error. Additionally or alternatively, video input analysis component 140 may notify control center 110 to insert a Begin Mark on the video frame where the error too fast zoom-in or zoom-out is first detected due to the rate at which objects or contours in the video frame are increasing or decreasing in size and notify control center 110 to insert an End Mark once the too fast zoom-in or zoom-out has stopped. The marked video segment may then be automatically edited out on playback or skipped over on playback. Consider user error 240 which involves poor panning due to uneven vertical or horizontal hand movement by the user. The user's hand does not move straight horizontally or vertically but oscillates around the horizontal or vertical axis. Sensor and time analysis component 135 may monitor accelerometer data from sensor inputs 150 to determine the horizontal or vertical stability of the motion of the smart device. If sensor and time analysis component 135 detects deviations that exceed a pre-defined value, notification is provided to control center 110 which generates feedback to the user. Alternatively, video input analysis component 140 analyses the incoming video frames from video input 160 to extract vertical and horizontal motion vectors and compares them to pre-defined values to detect poor panning due to uneven vertical or horizontal hand movement. If poor panning is detected, notification is provided by video input analysis component 140 to control center 110 which generates feedback to the user. Feedback may involve displaying a graphical icon indicating poor panning on video screen 120 with accompanying text informing the user of the error. Optionally, the recording may be paused by control center 110 instructing smart device recorder system 130 to pause the recording until the user has remedied the error. Additionally or alternatively, video input analysis component 140 may notify control center 110 to insert a Begin Mark on the video frame where the error of poor panning is first detected and notify control center 110 to insert an End Mark once the poor panning has stopped. The marked video segment may then be automatically edited out on playback or skipped over on playback.

Consider user error 245 which involves recording video with the smart device camera pointed directly into a bright light source or recording video in light conditions that are too low. Sensor and time analysis component 135 may monitor light sensor data from sensor inputs 150 to measure light intensity to detect situations where the smart device camera is directly aimed at a bright light source resulting in over illuminated scenes or is recording a dark scene. If sensor and time analysis component 135 detects either too bright a light source or light conditions that are too low, notification is provided to control center 110 which generates feedback to the user. Alternatively, video input analysis component 140 analyses the incoming video frames from video input 160 by measuring the white balance and contrast in the incoming video frames. If the white balance and contrast are outside of a pre-defined range, notification is provided by video input analysis component 140 to control center 110 which generates feedback to the user. Feedback may involve displaying a graphical icon indicating too bright a light source or that light conditions that are too low on video screen 120 with accompanying text informing the user of the error. Optionally, the recording may be paused by control center 110 instructing smart device recorder system 130 to pause the recording until the user has remedied the error. Additionally, or alternatively, video input analysis component 140 may notify control center 110 to insert a Begin Mark on the video frame where the error of too bright a light source or too low light conditions is first detected and notify control center 110 to insert an End Mark once the error is no longer detected. The marked video segment may then be automatically edited out on playback or skipped over on playback.

Consider user error 250 which involves recording video with the smart device camera not aligned with the scene horizon, the smart device camera is in a skewed orientation. Sensor and time analysis component 135 may monitor accelerometer data from sensor inputs 150 to determine the angle that the smart device camera makes in relation to the horizontal line of the horizon. Once the angle exceeds a pre-defined value, sensor and time analysis component 135 notifies control center 110 which generates feedback to the user. Alternatively, video input analysis component 140 analyses the incoming video frames from video input 160 by video identification of objects in the scene to determine where the horizontal line of the horizon is and how skewed the orientation of the smart device camera is with respect to the horizontal line. If the skew exceeds a pre-defined value, video input analysis component 140 notifies control center 110 which generates feedback to the user. Feedback may involve displaying a graphical icon on video screen 120 indicating that the smart device camera is skewed with accompanying text informing the user of the error. Optionally, the recording may be paused by control center 110 instructing smart device recorder system 130 to pause the recording until the user has eliminated the smart device camera skew. Additionally or alternatively, video input analysis component 140 may notify control center 110 to insert a Begin Mark on the video frame where the error of camera skew is first detected and notify control center 110 to insert an End Mark once the error is no longer detected.

The marked video segment may then be automatically edited out on playback or skipped over on playback, Consider user error 255 which involves holding the smart device camera in a vertical position while recording video. Sensor and time analysis component 135 may monitor accelerometer data from sensor inputs 150 to determine that the smart device camera is in the vertical position during recording. If the vertical position is detected, sensor and time analysis component 135 notifies control center 110 which generates feedback to the user. Feedback may involve displaying a graphical icon indicating that the smart device camera is vertical on video screen 120 with accompanying text informing the user of the error. Optionally, the recording may be paused by control center 110 instructing smart device recorder system 130 to pause the recording until the user has changed the smart device camera orientation to horizontal. Additionally or alternatively, sensor and time analysis component 135 may notify control center 110 to insert a Begin Mark on the video frame where the error of the smart device camera in vertical position first occurs and notify control center 110 to insert an End Mark once the orientation has been corrected by changing the orientation to horizontal. The marked video segment may then be automatically edited out on playback or skipped over on playback.

Consider user error 260 which involves oscillating audio gain. Audio input analysis component 145 may monitor audio input 165 to detect sound gain levels and their fluctuation over time. If audio gain level oscillation is outside a pre-defined range, audio analysis component 145 notifies control center 110 which generates feedback to the user. Feedback may involve displaying a graphical icon indicating that the audio gain level being recorded is oscillating excessively on video screen 120 with accompanying text informing the user of the error. Optionally, the recording may be paused by control center 110 instructing smart device recorder system 130 to pause the recording until the audio gain level oscillation is within the pre-defined range. Additionally or alternatively, audio input analysis component 145 may notify control center 110 to insert a Begin Mark on the video frame where the excessive audio gain level oscillation first occurs and notify control center 110 to insert an End Mark once the audio gain level oscillation is within acceptable limits. The marked video segment may then be automatically edited out on playback or skipped over on playback.

Consider user error 265 which involves wind noise. Audio input analysis component 145 may monitor audio input 165 to detect audio signal saturation and wind noise patterns. If audio signal saturation and wind noise patterns are detected, audio analysis component 145 notifies control center 110 which generates feedback to the user. Feedback may involve displaying a graphical icon indicating that excessive wind noise is present on video screen 120 with accompanying text informing the user of the error. Optionally, the recording may be paused by control center 110 instructing smart device recorder system 130 to pause the recording until the wind noise is no longer causing audio signal saturation. Additionally or alternatively, audio input analysis component 145 may notify control center 110 to insert a Begin Mark on the video frame where the excessive wind noise first occurs and notify control center 110 to insert an End Mark once the wind noise is within acceptable limits. The marked video segment may then be automatically edited out on playback or skipped over on playback.

Consider user error 270 which involves audio signal saturation. Audio signal saturation can arise from wind noise discussed above but may also rise from excessive sound levels reaching the audio input. Audio input analysis component 145 may monitor audio input 165 to detect audio signal saturation which typically manifests itself by audio clipping and is detectable in the frequency domain or time domain as the audio signal reaches maximal power and remains there. If audio signal saturation is detected by audio input analysis component 145, notification is provided by audio input analysis component 145 to control center 110 which generates feedback to the user. Feedback may involve displaying a graphical icon on video screen 120 indicating that audio signal saturation is present with accompanying text informing the user of the error. Optionally, the recording may be paused by control center 110 instructing smart device recorder system 130 to pause the recording until audio signal saturation has ceased. In addition, assuming there is at least one additional microphone associated with audio input 165, the audio capture from the saturated microphone can be muted and the audio capture may he switched to the microphone that is not saturated at the moment. Additionally or alternatively, audio input analysis component 145 may notify control center 110 to insert a Begin Mark on the video frame where the audio signal saturation first occurs and notify control center 110 to insert an End Mark once the audio signal saturation is gone. The marked video segment may then be automatically edited out on playback or skipped over on playback.

Consider user error 275 which involves too much commentary by the user. Audio input analysis component 145 may monitor audio input 165 to detect speech coming from the microphone that is oriented in the direction of the user. If audio input analysis component 145 detects an amount of speech that is excessive as defined, for example, by a user setting for a percentage of commentary speech in incoming PCM frames that is not to be exceeded, notification is sent by audio input analysis component 145 to control center 110 which generates feedback to the user. Feedback may involve displaying a graphical icon on video screen 120 indicating that excessive user commentary is present with accompanying text informing the user of the error. Optionally, the recording may be paused by control center 110 instructing smart device recorder system 130 to pause the recording until user commentary has ceased or been appropriately reduced. Additionally or alternatively, audio input analysis component 145 may notify control center 110 to insert a Begin Mark on the video frame where the excessive user commentary starts and notify control center 110 to insert an End Mark once the user commentary is within acceptable limits. The marked video segment may then be automatically edited out on playback or skipped over on playback.

Consider user error 280 which involves selection of a camera mode for the smart device camera by the user which does not provide a good match for the detected recording conditions. Each camera mode offers different camera settings, for example, for white balance, exposure, saturation, focus mode, and light metering (center, spot, average). Upon notification of specific user errors to control center 110, control center 110 checks alternative camera modes such as "night" adapted for low light conditions, "sport" adapted for rapidly moving subjects further away, "face" adapted for close up subjects and "land-scape" adapted for panning of static scenes and generates feedback to the user suggesting a more suitable camera mode. Feedback may involve displaying a graphical icon on video screen 120 indicating that an unsuitable camera mode is selected with accompanying text informing the user of the error and suggesting a more suitable camera mode. Optionally, control center 110 may switch camera modes automatically to reduce detected user errors.

Figure 3:
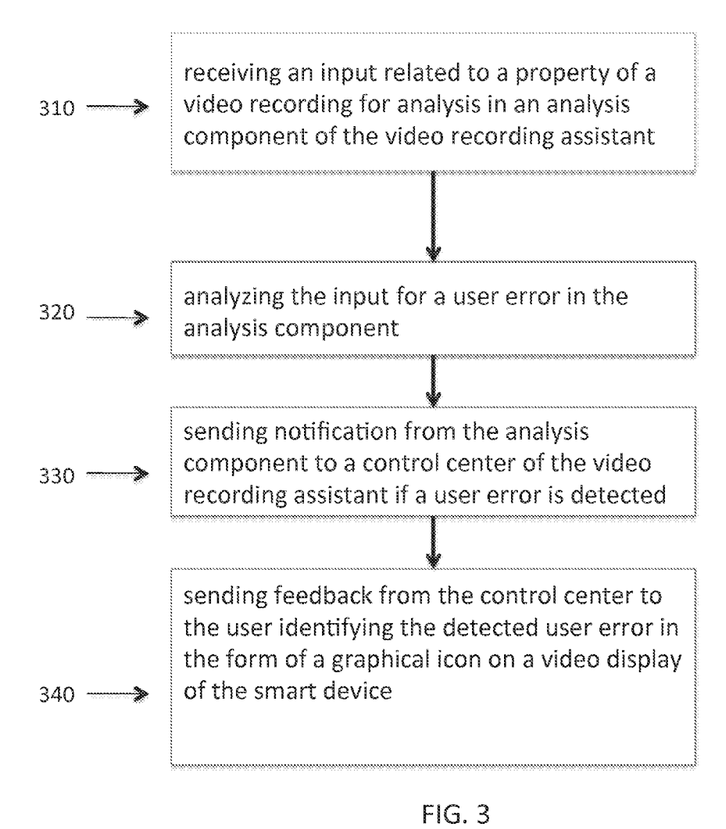
FIG. 3 shows an embodiment in accordance with an aspect of the invention.

FIG. 3 shows an embodiment in accordance with the invention of a method for video recording assistance using a smart device having video recording capability. Step 310 is receiving an input related to a property of a video recording for analysis in an analysis component of the video recording assistant. Step 320 is analyzing the input for a user error in the analysis component. Step 330 is sending notification from the analysis component to a control center of the video recording assistant if a user error is detected. Step 340 is sending feedback from the control center to the user identifying the detected user error in the form of a graphical icon on a video display of the smart device.

In the above description, specific details of various embodiments are provided, however, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

For the avoidance of doubt, the present disclosure extends to at least the subject matter of the following series of lettered clauses:

A. A method for interactively assisting a user with a video recording assistant in recording video content on a smart device having video recording capability, the method comprising:
receiving an input related to a property of a video recording for analysis in an analysis component of the video recording assistant;
analyzing the input for a user error in the analysis component;
sending notification from the analysis component to a control center of the video recording assistant if a user error is detected; and
sending feedback from the control center to the user identifying the detected user error in the form of a graphical icon on a video display of the smart device.

B. The method of Clause A wherein the input comprises video frames.

C. The method of Clause A wherein the input comprises audio frames.

D. The method of Clause A wherein the input comprises accelerometer data.

E. The method of Clause A wherein the input comprises light intensity data.

F. The method of Clause A wherein the graphical icon is animated to provide feedback as to a magnitude of the user error.

G. The method of Clause A wherein the control center causes a first digital mark to be created on a first video frame of the video recording when the user error is detected and causes a second digital mark to be put on a second video frame of the video recording when the user error is no longer detected.

H. The method of Clause G, further comprising automatically editing the video recording by detecting the first and second digital mark and skipping over or editing out video frames between and including the first and second video frames on playback by the video recording assistant.

I. The method of Clause B wherein the analysis in the analysis component comprises determining the motion vectors.

J. The method of Clause C wherein the analysis in the analysis component comprises detecting a wind noise pattern.

K. The method of Clause B wherein the analysis in the analysis component comprises determining a motion energy level of a scene.

L. The method of Clause A further comprising feedback to the user by providing an audio message.

M. The method of Clause A wherein the smart device is in a first camera mode and further comprising the control center checking whether the user error can be mitigated by switching the smart device to a second camera mode.

N. The method of Clause A wherein the property of the video recording is related to at least one of the group consisting of an audio input, a video input and a sensor input.

O. The method of Clause A wherein the control center automatically pauses the video recording if the user does not respond to the feedback with corrective measures after a pre-determined amount of time.

P. The method of Clause A wherein the control center tracks the user error over a plurality of video recordings and provides statistical feedback to the user on a frequency of the user error.

Q. The method of Clause P wherein the control center provides positive feedback to the user if the frequency of the user error decreases over time.

R. The method of Clause A wherein user settings are input into the control center by the user.

S. The method of Clause A wherein the control center provides suggestions for improvement to the user after completion of the video recording.

T. A non-transitory computer-readable storage medium comprising instructions that, when executed in the smart device having video recording capability, enable the method of Clause A.

The invention claimed is:

1. A method for interactively assisting a user with a video recording assistant in recording video content on a smart device having video recording capability, the method comprising:
receiving an input related to a property of a video recording for analysis in an analysis component of the video recording assistant;
analyzing the input for a user error in the analysis component;
sending notification from the analysis component to a control center of the video recording assistant if a user error is detected;
sending feedback from the control center to the user identifying the detected user error in the form of a graphical icon on a video display of the smart device; and
sending from the control center a correctional hint to be display on the video display when the user error is detected.

2. The method of claim 1, wherein the input comprises a one of video frames, audio frames, accelerometer data and light intensity data.

3. The method of claim 1, wherein the graphical icon is animated to provide feedback as to a magnitude of the user error.

4. The method of claim 1, wherein the control center causes a first digital mark to be created on a first video frame of the video recording when the user error is detected and causes a second digital mark to be put on a second video frame of the video recording when the user error is no longer detected.

5. The method of claim 4, further comprising automatically editing the video recording by detecting the first and second digital mark and skipping over or editing out video frames between and including the first and second video frames on playback by the video recording assistant.

6. The method of claim 1, in which the input comprises video frames wherein the analysis in the analysis component comprises a one of determining the motion vectors and determining a motion energy level of a scene.

7. The method of claim 1, in which the input comprises audio frames wherein the analysis in the analysis component comprises detecting a wind noise pattern.

8. The method of claim 1, further comprising feedback to the user by providing an audio message.

9. The method of claim 1, wherein the smart device is in a first camera mode and further comprising the control center checking whether the user error can be mitigated by switching the smart device to a second camera mode.

10. The method of claim 1, wherein the property of the video recording is related to at least one of the group consisting of an audio input, a video input and a sensor input.

11. The method of claim 1, wherein the control center automatically pauses the video recording if the user does not respond to the feedback with corrective measures after a pre-determined amount of time.

12. The method of claim 1, wherein the control center tracks the user error over a plurality of video recordings and provides statistical feedback to the user on a frequency of the user error.

13. The method of claim 1, wherein the control center at least one of provides positive feedback to the user if the frequency of the user error decreases over time and provides suggestions for improvement to the user after completion of the video recording.

14. The method of claim 1, wherein user settings are input into the control center by the user.

15. A non-transitory computer-readable storage medium comprising instructions that, when executed in a smart device having video recording capability, enable the method of claim 1.

16. A video recording assistant device for interactively assisting a user in recording video content on a smart device having video recording capability, the video recording assistant device comprising:
an analysis component to receive an input related to a property of a video recording for analysis, wherein the analysis component is configured to analyze the input for a user error in the analysis component; and
a control center to receive notification from the analysis component if a user error is detected, wherein the control center is configured to send feedback to display a graphical icon on a display of the smart device and the control center is further configured to automatically alter the video recording if the user error is detected.

17. The video recording assistant device of claim 16, wherein the input comprises a one of video frames, audio frames, accelerometer data and light intensity data.

18. The video recording assistant device of claim 16, wherein the graphical icon is animated to provide feedback as to a magnitude of the user error.

19. the video recording assistant device of claim 16, where in the control center is configured to provide a correction hint when the user error is detected.

* * * * *